Nov. 23, 1965    A. S. DRUMMOND    3,219,250
FLEXIBLE BACK-UP BAR

Filed Feb. 26, 1964    3 Sheets-Sheet 1

INVENTOR.
AUBREY S. DRUMMOND

BY
ATTORNEYS

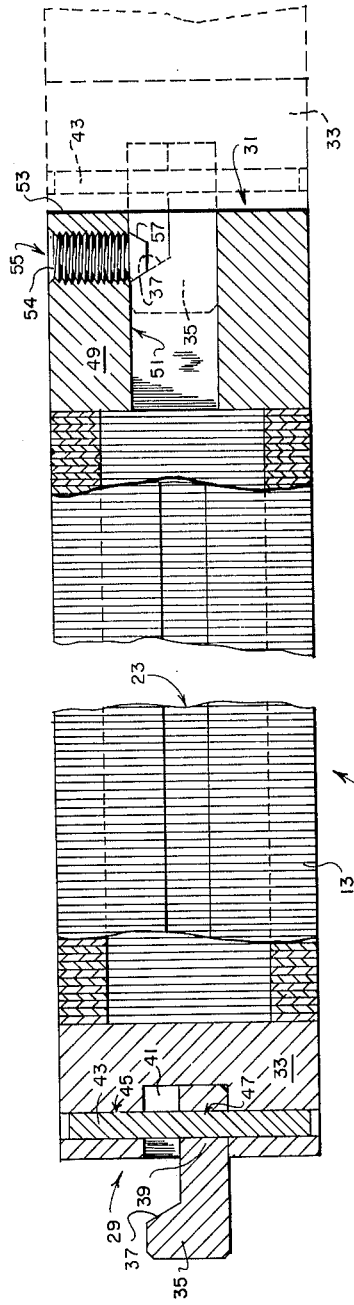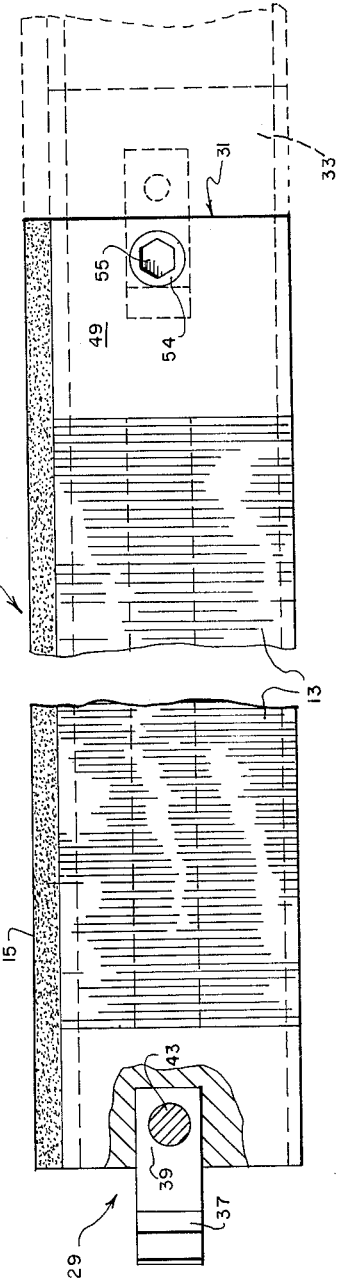

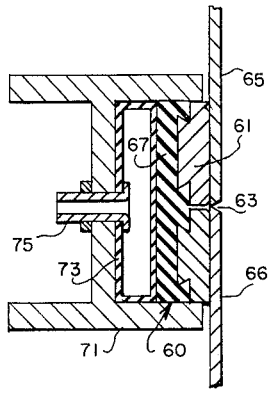
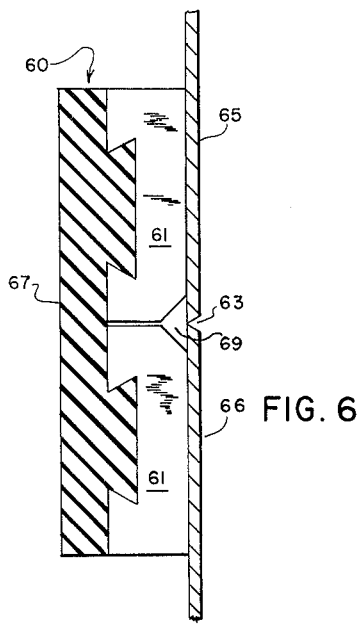
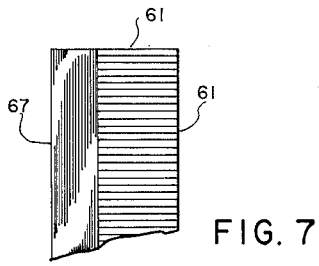

United States Patent Office 3,219,250
Patented Nov. 23, 1965

3,219,250
FLEXIBLE BACK-UP BAR
Aubrey S. Drummond, Huntsville, Ala., assignor to the United States of America as represented by the Administrator of the National Aeronautics and Space Administration
Filed Feb. 26, 1964, Ser. No. 347,626
14 Claims. (Cl. 228—50)
(Granted under Title 35, U.S. Code (1952), sec. 266)

The invention described herein may be manufactured and used by or for the Government of the United States of America without the payment of any royalties thereon or therefor.

This invention relates to improvements in backing elements for use in welding operations and more particularly to a back-up bar for use in welding cylindrical or other awkward shaped structures.

It is a common practice in butt welding edges of plates to apply a back-up bar or strip on the side opposite the welding operations to prevent the molten weld metal from running out at the joint or seam. The back-up bar maintains uniform contact with the plates at opposite sides of the seam to retain all the molten metal in the seam during the welding operation.

In welding cylindrical or other awkward formed structures, prior back-up bars had to be of a special design to match the surfaces of the structures being joined. A slight change in configuration or diameter of the structures, however, rendered the special back-up bar design obsolete and required another expensive and special back-up bar to be constructed.

Accordingly, it is an object of this invention to provide a back-up bar which will readily conform to awkward shaped surfaces of structures to be butt welded.

Yet another object is to proide a back-up bar which may be folded into a compact shape for storage and later be used on almost any shaped surface.

Other objects, uses, and advantages of the present invention will become apparent as the description proceeds.

The invention is directed to a plurality of thin plates contiguously arranged in a face-to-face relationship and forming with their outer orientated edges a backup contact surface which is to be pressed against the surfaces of the structures to be joined at opposite sides of the seam or joint. The thin plates are held in their substantially laminated position by an elastomeric ribbon member to which the inner orientated edges of the thin plates are secured. The outer edge of each plate may have a center groove or mold which will receive the molten metal from the seam joint during the welding operations to form a bead along the underside of the weld.

The invention may be modified to obtain greater transverse flexibility by replacing the single plate with two shorter plates of the same width whose contiguous side edges align with the seam to be welded so as to form two distinct rows of plates. The center groove in this instance would be formed by removing a portion of the upper contiguous corners of the two shorter plates.

This will be more readily understood by the following detailed description when taken together with the accompanying drawings in which:

FIGURE 4 is a longitudinal elevational view of one segment of the back-up bar shown in FIGURE 1 with the end portions in cross section;

FIGURE 5 is a longitudinal plan view of one segment of the back-up bar shown in FIGURE 1 with portions in cross section;

FIGURE 6 is a transverse cross sectional view of a modified back-up bar of the present invention;

FIGURE 7 is a longitudinal view of the modified back-up bar shown in FIGURE 6; and FIGURE 8 is a transverse cross section view showing one use of the back-up bar of the present invention.

Figure 1:
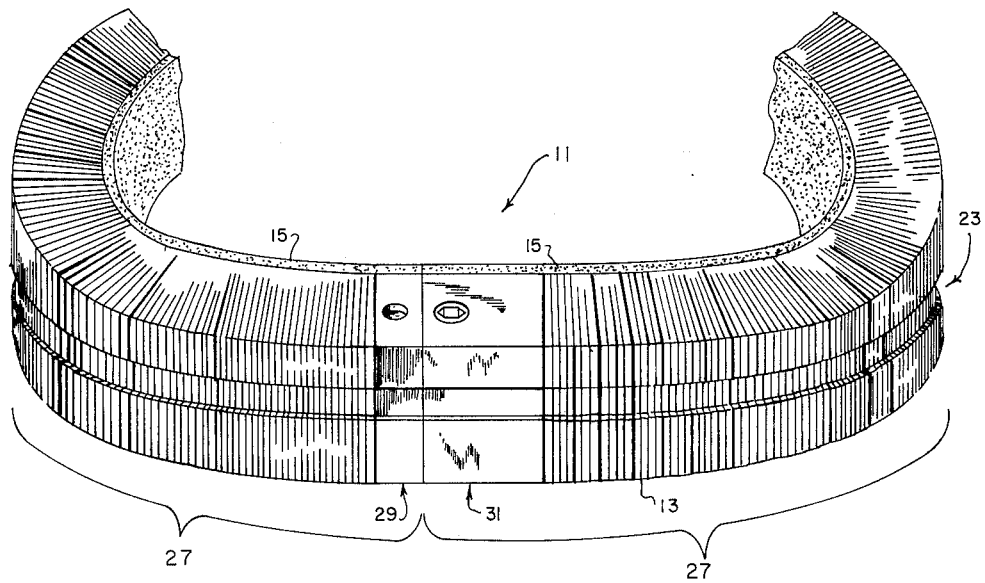
FIGURE 1 is a perspective view of a back-up bar of the present invention.
Figure 2:
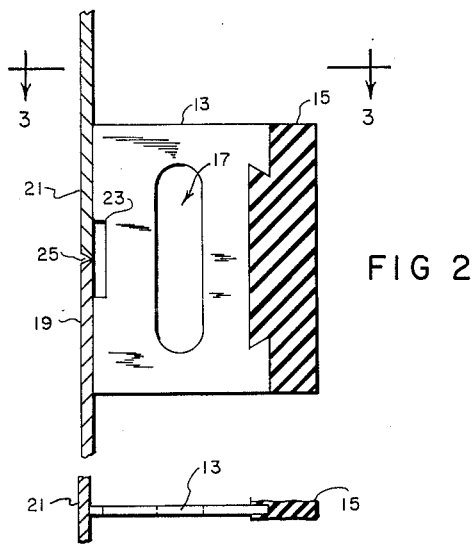
FIGURE 2 is a transverse cross section view showing the back-up bar of FIGURE 1 positioned for the welding of two structures.
Figure 3:
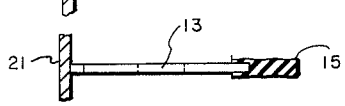
FIGURE 3 is taken along line 3—3 of FIGURE 2 with portions removed for clarity.

Referring now to FIGURES 1 and 2 which illustrate back-up bar 11 of the present invention as comprising a plurality of thin, substantially rectangular plates 13 arranged in a contiguous face-to-face relationship. The inner orientated edges of the plates 13, as best illustrated in FIGURE 2, are dovetailed into the outer orientated surface of an elongated elastomeric member 15 resembling a ribbon.

The width of each plate 13 should be exceedingly thin. For example, plate 13 has a width of 0.04 inch, a length of 1.9 inches, and a height of 1.2 inches. The center hole 17 in each plate 13 serves as a manufacturing aid when the plates are machined, and may be omitted entirely when the plates 13 are stamped from blanks.

The plates 13 may be made of stainless steel and the elastomeric ribbon member 15 may be made of silicone rubber, however, it is apparent that other materials could be used in a satisfactory manner.

In FIGURE 2, two structures 19 and 21 to be butt welded are shown positioned upon the outer edge surface of the plates 13. The outer edge of each plate 13 has a center groove 23 adapted to coincide with the joint or seam 25 formed by the structures 19 and 21 to be welded. The groove 23 is adapted to receive molten metal from the joint 25 during the welding operations to form a bead along the underside of the weld.

By making the back-up bar 11 into distinct segments 27, shown by FIGURE 1, additional versatility is obtained. With segments 27 of standard length, any length or circumference may be had for the back-up bar 11 simply by removing or adding segments 27 as needed. Special segment lengths may also be provided to take care of special circumstances.

The two ends of each segment 27 are provided with male and female connection means, 29 and 31, respectively, to enable the segments 27 to be easily joined. As shown in FIGURES 4 and 5 the male connection means 29 comprises a block 33 which, while having a relative thick width, is of the same height and length as the thin plates 13. The block 33 is also dovetailed within the elastomeric ribbon member 15 in the same manner as the thin plates 13.

A hook member 35 having a tapering cam surface 37 is supported centrally of the exposed end of the male end block 33. The hook member 35 has a rectangular base 39 fitted within a recess 41 within the block 33. A dowel member 43 extends through align bores 45 and 47 within the block 33 and base 39 to prevent the hook member 35 from being pulled away from the block 33.

The female end 31 also has a block 49 which has a bore 51 extending therethrough from its exposed end 53. The male hook 35 of an adjacent segment 27 is adapted to be inserted within the bore 51. A screw 54 with an Allen head recess 55 is threaded into the block 49 to engage the hook member 35 and lock it within the bore 51. The tapered end 57 of the screws 54 engages the cam surface 37 of the hook member 35 and draws the adjacent segments 27 into a tight fitting relationship. The block 49 also is dovetailed within the elastomeric ribbon member 15 in the same manner as the plates 13.

The outer surface of the end blocks 33 and 49 are grooved in a manner similar to the grooves 23 of the plates 13.

If advantageous, the male and female connection means 29 and 31 may be eliminated and ends of the resulting segments joined by fusing the ends of the elastomeric member 15 to form a continuous back-up bar.

A modified version 60 of a back-up bar built in accordance with the present invention is illustrated in FIGURES 6 and 7. This modified version achieves even greater transverse flexibility by replacing each plate 13 of the embodiment shown in FIGURE 1 with two similar plates 61 whose contiguous side edges align with the seam 63 formed by the structures 65 and 66 to be butt welded. The use of two plates 61 forms two rows of plates as compared with the single row of the embodiment shown in FIGURE 1.

The inner edge of each plate 61 is dovetailed within the outer surface of the elongated elastomeric member 67. The center groove 69 beneath the joint or seam 63 is formed by beveling or removing a portion of the outer contiguous corners of the two short plates 61.

The two plates 61 each have a substantial rectangular shape with two major face surfaces and the width of each plate may be the same, 0.04 inch, as the embodiment of FIGURE 1.

The use of two plates 61, enables the back-up bar 60 to conform to structures of different transverse slopes about the joint 63 to be welded and easily compensates for the different warpages of the plates 65 and 66 during the welding operations.

While the modified back-up bar 60 may be segmented in a manner similar to the embodiment of FIGURE 1, it is preferred if the elastomeric ribbon member 67 be fused to adjacent segments to form a substantial continuous ribbon member.

Both of the described embodiments may be used as inserts in the rigid channel beam 71 shown in FIGURE 8 and more completely described in copending patent application, S.N. 341,361, filed January 30, 1964, entitled "Segmented Back-up Bar," invented by W. J. Franklin and N. C. Martin and assigned to the same assignee. While only the transverse double plate embodiment of the bar shown in FIGURE 5 is illustrated as an insert in FIGURE 7, it is apparent that the single plate embodiment of FIGURE 1 may also be used in the same manner.

In FIGURE 7, the rigid channel member 71 has within its outer channel recess an inflatable bladder 73 which receives air through an inlet tube 75, from a source not shown, causing the flexible back-up bar 60 of the present invention to be uniformly pressed against the surfaces of the two structures 65 and 66 forming the joint to be welded.

Thus, it is apparent that a novel backing element for welding operations has been disclosed which readily conforms to the shape of the surfaces of the structures to be welded and eliminates the need of special one-time back-up elements for awkward shaped structures.

Obviously, many modifications and variations of the present invention are possible in light of the above teachings. It is therefore, to be understood that within the scope of the appended claims the invention may be practiced other than as specifically described.

What is claimed is:

1. A backing element for use in welding operations, comprising:
    (a) an elastomeric ribbon member;
    (b) a plurality of plates;
    (c) each said plate having a very thin width as compared with its height and length so as to form two major face surfaces;
    (d) said plates being arranged in a face-to-face relationship and forming with their outer orientated edges a back-up contact surface adapted to be pressed against body structures at opposite sides of a joint to be welded; and
    (e) each said plate having its inner orientated edge dovetailed transversely within the outer orientated surface of said elastomeric member whereby said plates may move relative to each other to readily conform to awkward shaped workpiece surfaces.

2. A backing element as defined by claim 1 wherein each said plate has a width of approximately 0.04 inch.

3. A back-up bar, comprising:
    (a) a plurality of elongated segments joined end-to-end;
    (b) each said segment having:
        (1) an elastomeric ribbon member,
        (2) a plurality of thin, substantially rectangular plates arranged in a contiguous face-to-face relationship and forming with their outer orientated edges a back-up contact surface adapted to be pressed against body structures at opposite sides of a joint to be welded.
        (3) each said plate having its inner edge secured to the outer surface of said ribbon member,
        (4) the outer edge of each plate having a center groove adapted to receive molten metal from the joint to be welded.

4. A back-up bar as defined by claim 3 wherein each said plate has a thickness of approximately 0.04 inch.

5. A back-up bar for use in butt welding operations, comprising:
    (a) a plurality of elongated segments jointed end-to-end;
    (b) each said segment having:
        (1) an elastomeric ribbon member,
        (2) a plurality of thin, substantially rectangular plates arranged in a contiguous face-to-face relationship and forming with their outer orientated edges a back-up contact surface adapted to be pressed against body structures opposite each side at the joint to be welded;
        (3) each said plate having its inner edge surface secured transversely to the outer surface of said ribbon member whereby said plates may move relative to each other to readily conform to awkward shaped workpiece surfaces, and
        (4) connection means for joining adjacent segments in an end-to-end manner.

6. A backing element for use in welding operations, comprising:
    (a) an elastomeric ribbon member;
    (b) two parallel rows of plates, each plate of each row being aligned transversely to said rows;
    (c) each said plate having a very thin width as compared with its height and length so as to form two major face surfaces;
    (d) said plates of each row being arranged in a face-to-face relationship and forming with their outer orientated edges a back-up contact surface;
    (e) each said row having one of its sides contiguous to the other row so that the inside side edge of each plate of one row is contiguous to the inside side edge of a corresponding plate in the other row;
    (f) the inner edge of each plate of each row being secured to the outer surface of said ribbon member.

7. A backing element as defined by claim 6 wherein each said plate has a width of approximately 0.04 inch.

8. A flexible back-up bar, comprising:
    (a) an elastomeric ribbon member;
    (b) an elongated row of plates;
    (c) each said plate having a very thin width as compared with its height and length so as to form two major face surfaces;

(d) said plates being arranged in a face-to-face relationship and forming with their outer orientated edges a back-up contact surface;

(e) each said plate having its inner edge secured transversely to the outer surface of said ribbon member whereby said plates may move relative to each other to readily conform to awkward shaped workpiece surfaces.

9. A flexible back-up bar as defined by claim 8 including:

(a) a second row of corresponding plates;

(b) each said row having one of its sides contiguous to the other row so that the inside side edge of each plate of each row is contiguous to the inside side edge of a corresponding plate in the other row.

10. In combination with a back-up bar comprising an elongated rigid frame member having an outer channel recess with an inflatable bladder at the bottom of said recess, an improved flexible backing element supported upon the bladder; said flexible backing element, comprising:

(a) an elastomeric ribbon member;

(b) an elongated row of plates, each plate transversely aligned to said row;

(c) each said plate having a very thin width as compared with its height and length so as to form two major face surfaces;

(d) said plates being arranged in a face-to-face relationship and forming with their outer orientated edges a back-up contact surface;

(e) each said plate having its inner edge transversely secured to the outer surface of said ribbon member whereby said plates may move relative to each other to readily confirm to awkward shaped workpiece surfaces.

11. The combination as defined by claim 10 wherein said plates have a width of approximately 0.04 inch.

12. The combination as defined by claim 10 including:

(a) a second row of corresponding plates;

(b) each said row having one of its sides contiguous to the other row so that the inside side edge of each plate of each row is contiguous to the inside side edge of a corresponding plate in the other row.

13. A backing element for use in welding operations; comprising:

(a) a ribbon member of silicone rubber;

(b) an elongated row of stainless steel plates, each plate transversely aligned to said row;

(c) each of said plate having a very thin width as compared with its height and length so as to form two major face surfaces;

(d) said plates being arranged in a face-to-face relationship and forming with their outer orientated edges a back-up contact surface;

(e) each said plate having its inner edge secured to the outer surface of said ribbon member whereby said plates may move relative to each other to readily conform to awkward shaped workpieces.

14. A back-up bar for use in welding operations, comprising:

(a) a plurality of elongated segments joined together at their ends;

(b) each said segment, comprising:

(1) an elastomeric ribbon member;

(2) an elongated row of plates, each plate transversely aligned to said row;

(3) each said plate having a very thin width as compared with its height and length so as to form two major face surfaces;

(4) said plates being arranged in a face-to-face relationship and forming with their outer orientated edges a back-up contact surface;

(5) each said plate having its inner orientated edge secured to the outer surface of said ribbon member whereby said plates may move relative to each other to readily conform to awkward shaped workpieces.

References Cited by the Examiner
UNITED STATES PATENTS

| | | | |
|---|---|---|---|
| 2,365,226 | 12/1944 | Stout | 228—50 |
| 2,631,215 | 3/1953 | Randall et al. | 219—158 |
| 2,887,972 | 5/1959 | Handley | 228—50 |

WHITMORE A. WILTZ, *Primary Examiner.*